Patented Mar. 24, 1931

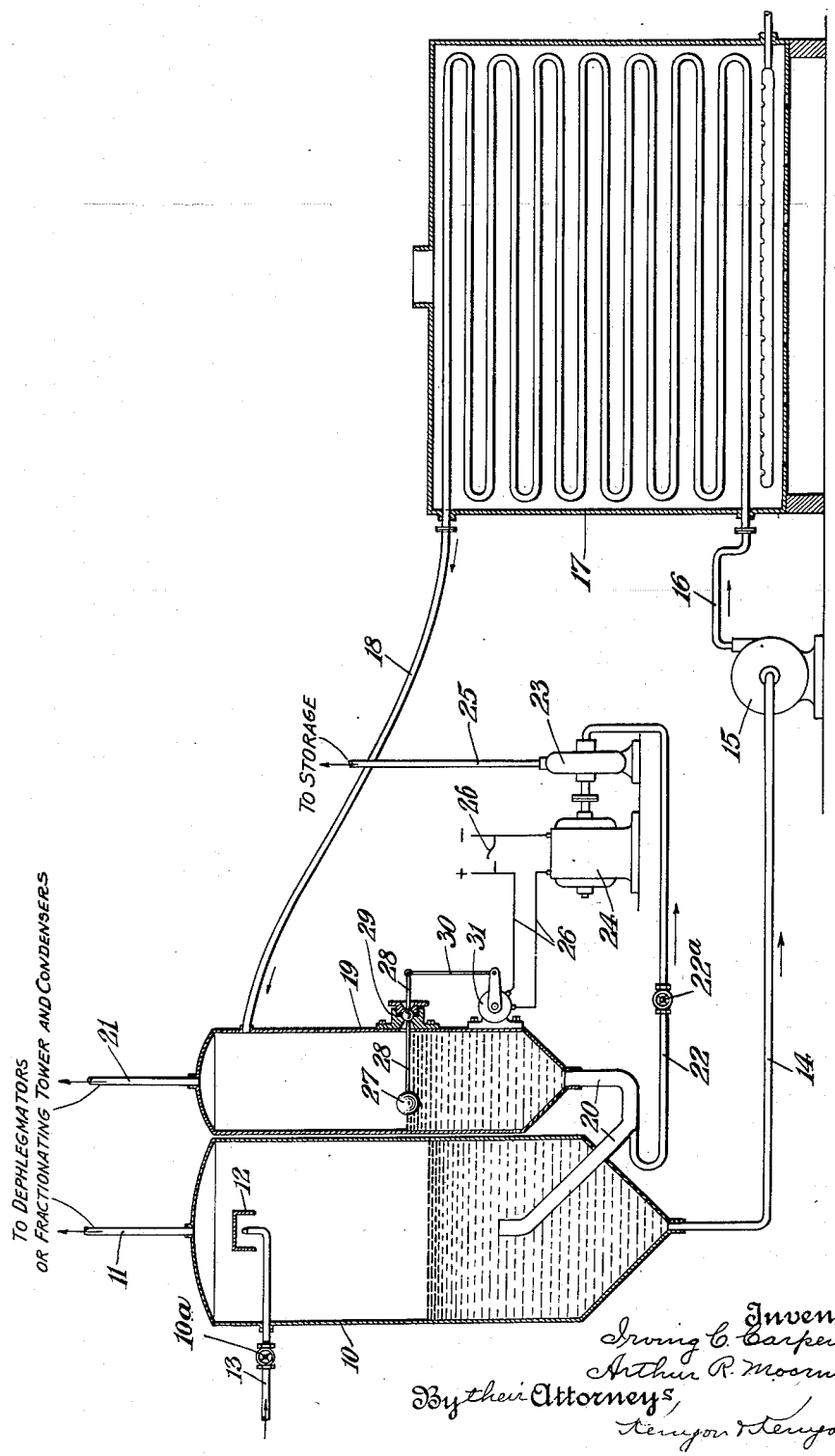

1,797,715

UNITED STATES PATENT OFFICE

IRVING C. CARPENTER, OF NEW YORK, N. Y., AND ARTHUR R. MOORMAN, OF TULSA, OKLAHOMA, ASSIGNORS, BY MESNE ASSIGNMENTS, TO CONTACT FILTRATION COMPANY, OF SAN FRANCISCO, CALIFORNIA, A CORPORATION OF DELAWARE

DISTILLATION OF HYDROCARBONS

Application filed September 17, 1926. Serial No. 136,030.

This invention relates to refining or distilling crude petroleum or other hydrocarbon oils to obtain therefrom a desired fraction, such for example, as gasoline, kerosene, or other cut.

Heretofore it has been thought impractical to utilize a tube heater in the refining of crude oil contaminated with water containing salts or other scale-forming material because of the fact that during the passage of the oil through the heater the water content is evaporated and the salts or other scale-forming materials deposited on the walls of the tube. Within a short time the tubes become so clogged as to prevent satisfactory operation. It is then necessary to discontinue operations until the tubes have been cleaned.

It is an object of this invention to utilize a tube heater for the distillation of such oil and to prevent formation of scale in the tubes.

According to this invention a supply of oil in a tank is heated to a temperature above the vaporization point of water by passing the oil through a circulating system including the tank, a pump, the heater and a separating chamber. Oil to be refined is separately added to the oil in the tank and because of the temperature of the oil in the tank any water contained in the added oil is immediately vaporized together with such of the lighter hydrocarbons as are volatile at the temperature of the oil in the tank. These vapors pass out through a vent in the top of the tank and may be collected for further treatment. Any scale-forming material which the water may have contained is deposited in the body of oil in solid form and is freely carried through the heater with the oil. As the oil passes through the heater it is raised to a higher temperature and any hydrocarbons in the oil which are volatile at the temperature to which oil is raised are vaporized. The oil and vapor are fed to the separating chamber, the oil collecting in the bottom of the chamber and the vapor being led out through a vent and collected for further treatment. Means are provided for withdrawing from the circulating system enough of the residuum discharged from the separating chamber to maintain substantially constant the volume of oil in the tank. The design of the circulating system is such that the oil returned to the tank maintains the temperature of the oil therein sufficiently high that water in the oil separately added to the tank is vaporized on contact with the surface thereof. The residuum withdrawn from the circulating system is collected for further treatment. The temperature of the heater is so regulated that the oil collected as residuum in the separating chamber has the desired flash point.

Other objects, novel features and advantages of this invention will be apparent from the following specification and accompanying drawing where is diagrammatically disclosed one type of apparatus for refining oil in accordance with the invention.

In the apparatus disclosed 10 is a closed tank having a vent pipe 11 which may lead to a dephlegmator or fractionating tower. A baffle plate 12 is arranged in the upper part of tank 10 and inlet pipe 13 has its inner end upturned toward the plate. A pipe 14 leads from the bottom of the tank 10 to a pump 15 from which a pipe 16 leads to the inlet of a tube heater 17. The outlet of the heater 17 communicates through a pipe 18 with a settling or separating chamber 19, located adjacent the tank 10 and connected thereto by pipe 20 through which liquid may flow from the chamber 19 to the tank 10 by gravity. The separating chamber 19 is provided with a vent pipe 21 which may lead to the same or a different dephlegmator or fractionating tower as the one to which the pipe 11 leads. A branch pipe 22 leads from the pipe 20 to the inlet of pump 23 driven by the motor 24. Outlet 25 of the pump 23 leads to a collection or storage tank not shown.

In the use of this apparatus a supply of oil is introduced into the tank 10 and circulated by means of the pump 15 through the heater 17, chamber 19 and back to the tank 10, until it has attained the proper temperature, the valve 22a in the pipe 22 being closed, and the pump 23 idle. The circulation of the oil is continued until the oil in the tank has attained the desired temperature which should preferably be high enough that water coming in contact with the surface thereof is vaporized immediately thereby preventing foaming. In being brought up to this temperature the oil is heated in the heater 17 to a temperature considerably above the temperature desired in the tank, the temperature to which it is heated being dependent upon the results desired.

After the oil in the tank has attained the proper temperature, and it has been found that a temperature of 375° F. is very satisfactory, oil to be refined is introduced through the pipe 13 and sprayed over the surface of the oil in the tank 10 through the medium of the baffle 12. The water content and any light hydrocarbons are immediately vaporized and pass out through the vent 11. The added oil mixed with some of the oil originally in the tank 10 is forced by the pump 15 through the heater 17 where its temperature is materially increased. This increase of temperature causes volatilization of more hydrocarbons which separate from their residuum in the chamber 19 and are vented through the pipe 21 to a dephlegmator or the like. The temperature to which the oil is raised in the heater 17 depends upon the fraction it is desired to separate from the residuum and is so regulated that the oil is heated to a temperature sufficient to produce the proper flash point in the residuum collected in the separating chamber. The residuum in the chamber 19 flows by way of the pipe 20 into the tank 10. At the same time that oil to be refined is admitted to the chamber 10 the valve 22a is opened and the pump 23 started by closing the switch 26. The residuum discharged from the chamber 19 divides, part of it returning to the tank 10 and part of it being drawn off through the pipe 22, pump 23 and pipe 25 to the storage tank. The valve 22a may be so set or the speed of the pump 23 so regulated that enough residuum is removed from the system through the pipe 22 to maintain substantially uniform the volume of oil to the system. The volume and temperature of the fluid returned to the tank 10 is such that sufficient heat is supplied to the oil in the tank 10 to compensate for the heat dissipated in the evaporation of the water and the lighter hydrocarbons. The fluid in the tank is therefore maintained at a substantially constant temperature which is such that substantially no water penetrates the liquid to any depth thereby preventing foaming. The rate of supply of oil to be refined to the tank 10 may be regulated by the valve 10a to maintain proper operating conditions in the system.

Automatic means may be provided if desired for controlling the amount of liquid withdrawn from the system through pipe 22 in response to changes in level of the fluid in the tank 10. This means may comprise a float 27 supported at one end of a lever 28, pivotally mounted in the stuffing box 29 or the like, attached to the tank. The outer end of the lever 28 is attached by a link, or the like, 30 with the arm of a rheostat 31, by means of which is controlled the operation of the motor 24 for driving the pump 23. When this automatic means is made use of the switch 26 is left open and the valve 22a is also left open.

An apparatus of this character will function indefinitely for there is no opportunity for deposition of scale on the walls of the heater tubes. Any scale-forming material contained in the water with which the oil is contaminated assumes solid form in the oil after the evaporation of the water and passes freely through the pipes of the system. There is no evaporation of water in the tubes and consequently no deposition of any material therein. It is, of course, evident that the apparatus above described is merely one embodiment by means of which the process may be practiced and that various modifications may be made without in any way departing from the spirit of the invention as set forth in the appended claims.

The process above described is not limited to the removal of water or scale-forming material from oil to be refined, but may be utilized wherever the oil is contaminated with an undesirable material which can be separated from the oil at a temperature somewhat below the vaporization temperature of the residuum obtained by the process.

What we claim as new and desire to secure by Letters Patent of the United States is:

1. In an apparatus of the character described, a tank, a pipe still, means for supplying liquid from said tank to said pipe still, a separating chamber connected to said still, connections between said separating chamber and tank, a vent for permitting the escape of vapors from said separating chamber and means controlled by the level of the liquid in said separating chamber for maintaining constant the volume of the liquid in said tank.

2. In an apparatus of the character described, a tank, a pipe still, means for supplying liquid from said tank to said pipe still, a separating chamber connected to said still, connections between said separating chamber and tank to maintain equal liquid levels, a vent for permitting the escape of vapors from said separating chamber and means for removing heated oil from said system.

3. In a process of refining oils, the steps of maintaining a body of oil at a temperature above the vaporization point of water but not substantially above the vaporization point of a desired oil fraction, by heating a stream of oil withdrawn from said body to a temperature above the vaporization point of water but not substantially above the vaporization point of the desired oil fraction, separating the vapors from the heated liquid, and returning the unvaporized heated liquid to said body and separately feeding onto the surface of said body a stream of oil to be treated.

4. In a process of refining oils, the steps of maintaining a body of oil at a temperature above the vaporization point of water but not substantially above the vaporization point of a desired oil fraction, by heating a stream of oil withdrawn from said body to a temperature above the vaporization point of water but not substantially above the vaporization point of a desired oil fraction, separating vapors from the heated liquid, returning a portion of the unvaporized heated liquid to said body, separately feeding onto the surface of said body a stream of oil to be treated, and separating vapors emanating from said oil body.

5. In a process of refining oils, the steps of maintaining the body of oil at a temperature above the vaporization point of water but not substantially above the vaporization point of a desired oil fraction, by heating a stream of oil withdrawn from said body to a temperature above the vaporization point of water but not substantially above the vaporization point of a desired oil fraction, separating the vapors from the heated liquid, returning a portion of the unvaporized heated liquid to said body, regulating the amount of heated liquid returned to said body to maintain the volume thereof substantially constant, and separately feeding onto the surface of said body a stream of oil to be treated.

6. In a process of refining oils, the steps of maintaining the body of oil at a temperature above the vaporization point of water but not substantially above the vaporization point of a desired oil fraction, by heating a stream of oil withdrawn from said body to a temperature above the vaporization point of water but not substantially above the vaporization point of a desired oil fraction, separating the vapors from the heated liquid, returning a portion of the heated liquid to said body, regulating the amount of heated liquid returned to said body to maintain the volume thereof substantially constant, separately feeding onto the surface of said body a stream of oil to be treated, and separately removing vapors emanating from said oil body.

In testimony whereof, we have signed our names to this specification.

IRVING C. CARPENTER.
ARTHUR R. MOORMAN.